(12) United States Patent
Kobayashi et al.

(10) Patent No.: US 12,151,638 B2
(45) Date of Patent: Nov. 26, 2024

(54) SIDE AIRBAG DEVICE

(71) Applicant: Autoliv Development AB, Vargarda (SE)

(72) Inventors: Yuto Kobayashi, Kanagawa (JP); Takaki Shibuya, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 18/546,235

(22) PCT Filed: Jan. 27, 2022

(86) PCT No.: PCT/JP2022/003153
§ 371 (c)(1),
(2) Date: Aug. 11, 2023

(87) PCT Pub. No.: WO2022/176561
PCT Pub. Date: Aug. 25, 2022

(65) Prior Publication Data
US 2024/0116471 A1    Apr. 11, 2024

(30) Foreign Application Priority Data
Feb. 17, 2021    (JP) .................................. 2021-023393

(51) Int. Cl.
B60R 21/231    (2011.01)
B60R 21/217    (2011.01)
(Continued)

(52) U.S. Cl.
CPC ...... B60R 21/23138 (2013.01); B60R 21/217 (2013.01); B60R 21/235 (2013.01);
(Continued)

(58) Field of Classification Search
CPC .... B60R 2021/23146; B60R 21/23138; B60R 21/237; B60R 21/217; B60R 21/235;
(Continued)

(56) References Cited

U.S. PATENT DOCUMENTS

2015/0353045 A1    12/2015    Sendelbach et al.
2017/0341615 A1*   11/2017    Kobayashi .......... B60R 21/2334
(Continued)

FOREIGN PATENT DOCUMENTS

EP    3431346 A1 *   1/2019    ........... B60R 21/207
JP    9-323607 A     12/1997
(Continued)

Primary Examiner — Amy R Weisberg
Assistant Examiner — Matthew D Lee
(74) Attorney, Agent, or Firm — Harness, Dickey & Pierce, P.L.C.; Stephen T. Olson

(57) ABSTRACT

The side airbag device is provided with a cushion, an inflator arranged on the occupant side of a side part of a seat frame, and a support plate, where the cushion in a folded state includes: a first portion positioned on the occupant side of the seat frame side part, and a second portion positioned on the side opposite the occupant side of the seat frame side part and wraps around the vehicle front side from the first portion to sandwich the seat frame side part together with the first portion; and the support plate includes: a main body part for supporting the second portion, and a rearward extending part, in which through-holes and are formed extending from the main body part toward the rear of the vehicle beyond the second portion for allowing stud bolts and of the inflator to pass through.

12 Claims, 8 Drawing Sheets

(51) Int. Cl.
*B60R 21/235* (2006.01)
*B60R 21/237* (2006.01)

(52) U.S. Cl.
CPC .. *B60R 21/237* (2013.01); *B60R 2021/23146* (2013.01); *B60R 2021/23509* (2013.01); *B60R 2021/23538* (2013.01)

(58) Field of Classification Search
CPC ........ B60R 2021/23509; B60R 21/207; B60R 2021/23538; B60R 21/231; B60R 21/2334
See application file for complete search history.

(56) References Cited

U.S. PATENT DOCUMENTS

| | | | |
|---|---|---|---|
| 2018/0111579 A1* | 4/2018 | Shimizu | B60R 21/201 |
| 2023/0182673 A1* | 6/2023 | Kobayashi | B60R 21/2342 280/730.2 |

FOREIGN PATENT DOCUMENTS

| | | | | |
|---|---|---|---|---|
| JP | 2000-168485 A | 6/2000 | | |
| JP | 2010-95020 A | 4/2010 | | |
| WO | WO-2013034742 A1 * | 3/2013 | ........... | B60R 21/207 |
| WO | 2014/017211 A1 | 1/2014 | | |
| WO | 2014/098734 A1 | 6/2014 | | |
| WO | 2017/056521 A1 | 4/2017 | | |
| WO | WO-2022080286 A1 * | 4/2022 | ........... | B60R 21/201 |

* cited by examiner

[FIG. 1]
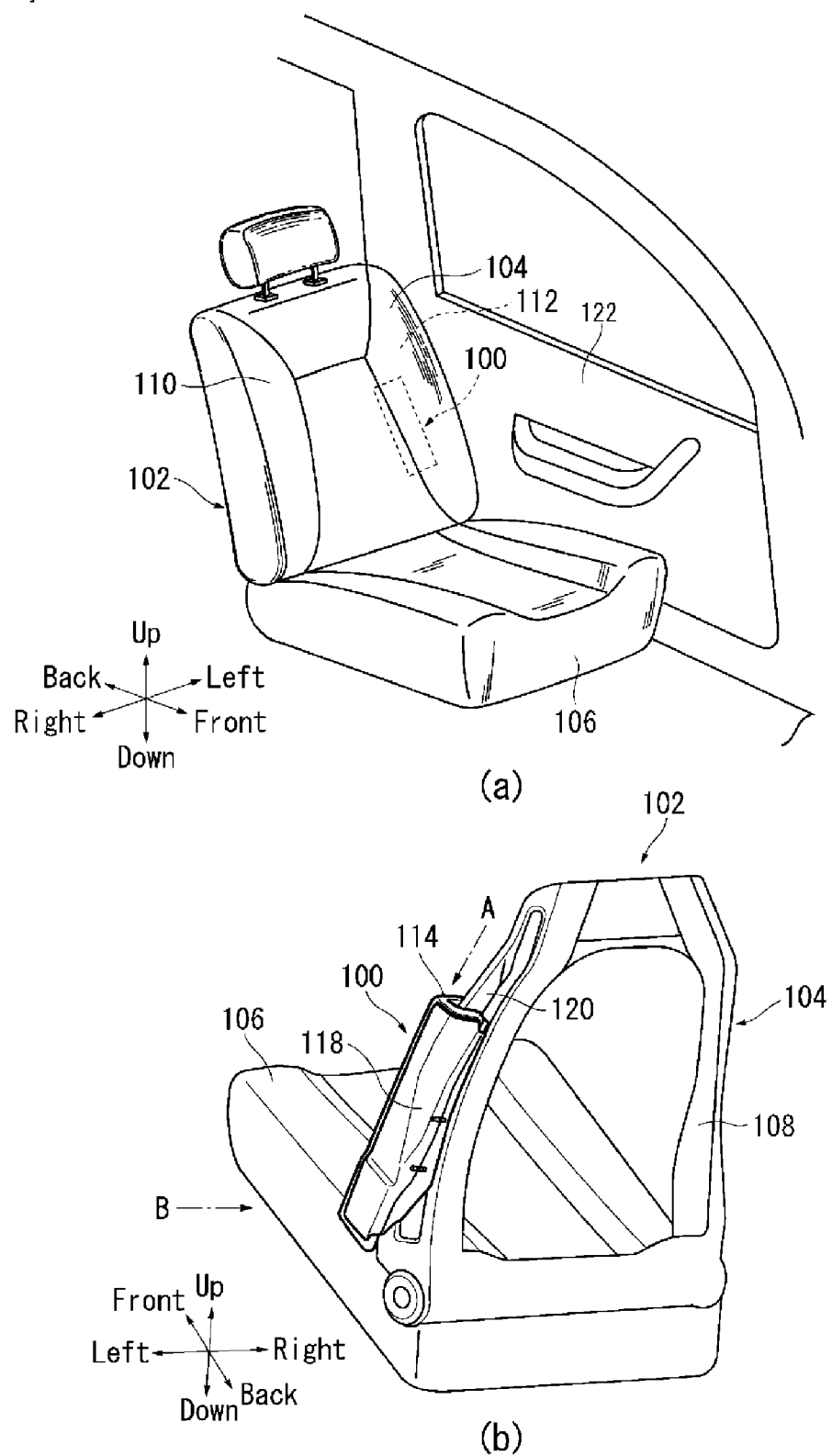
(a)
(b)

[FIG. 2]
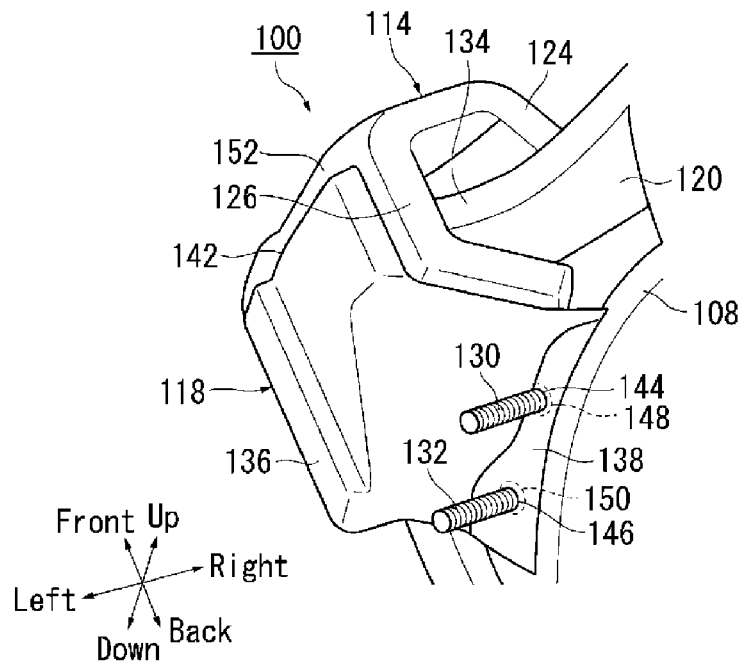
(a)
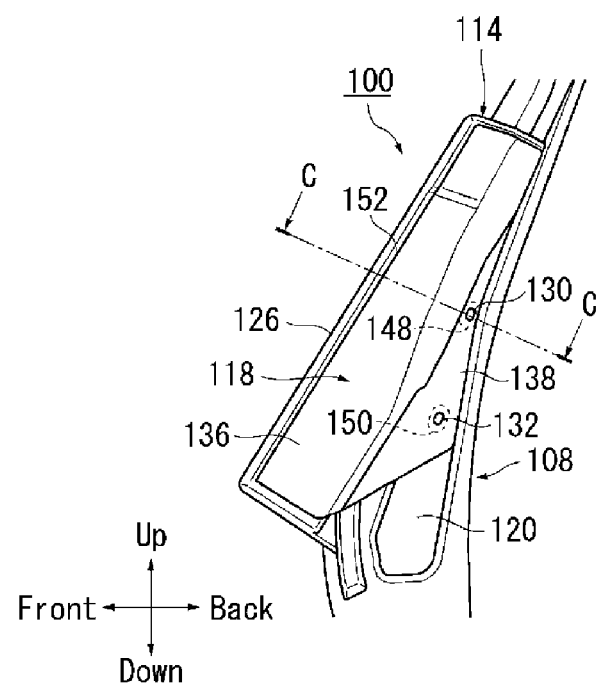
(b)

[FIG. 3]
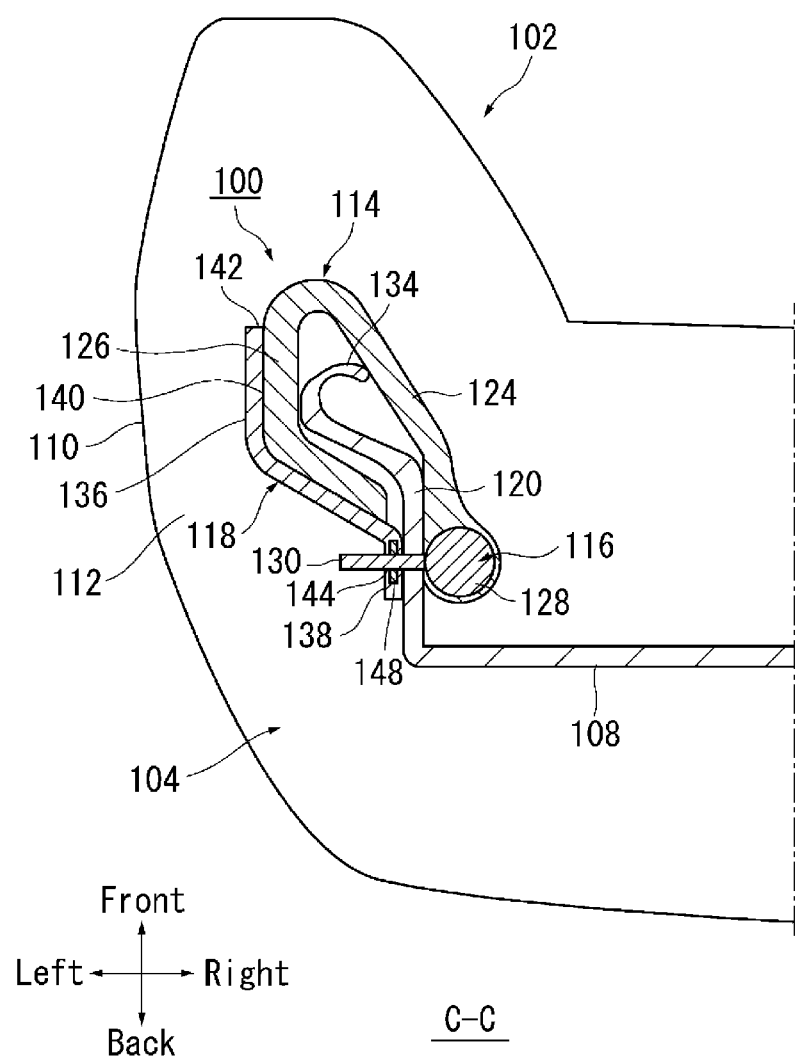

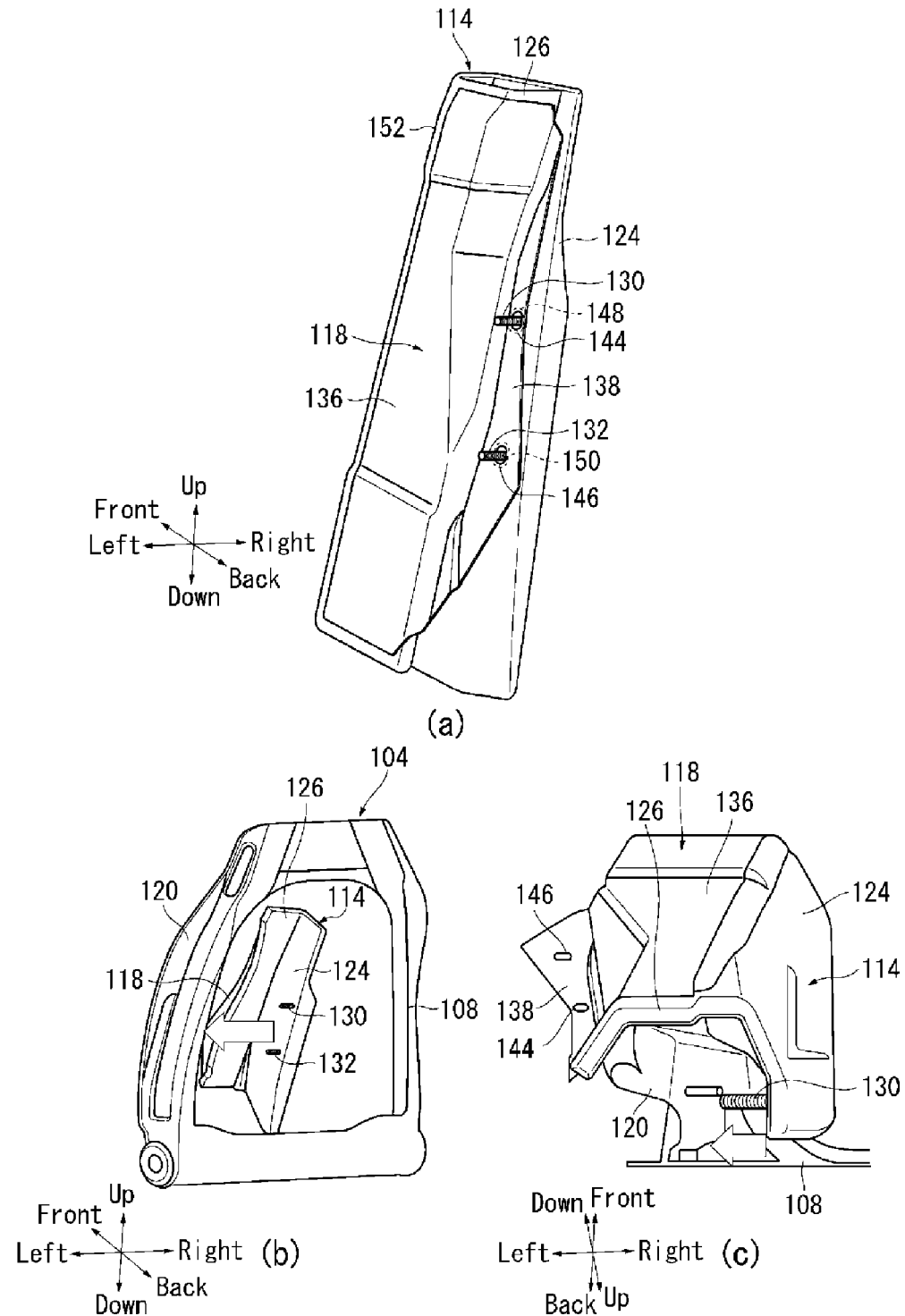

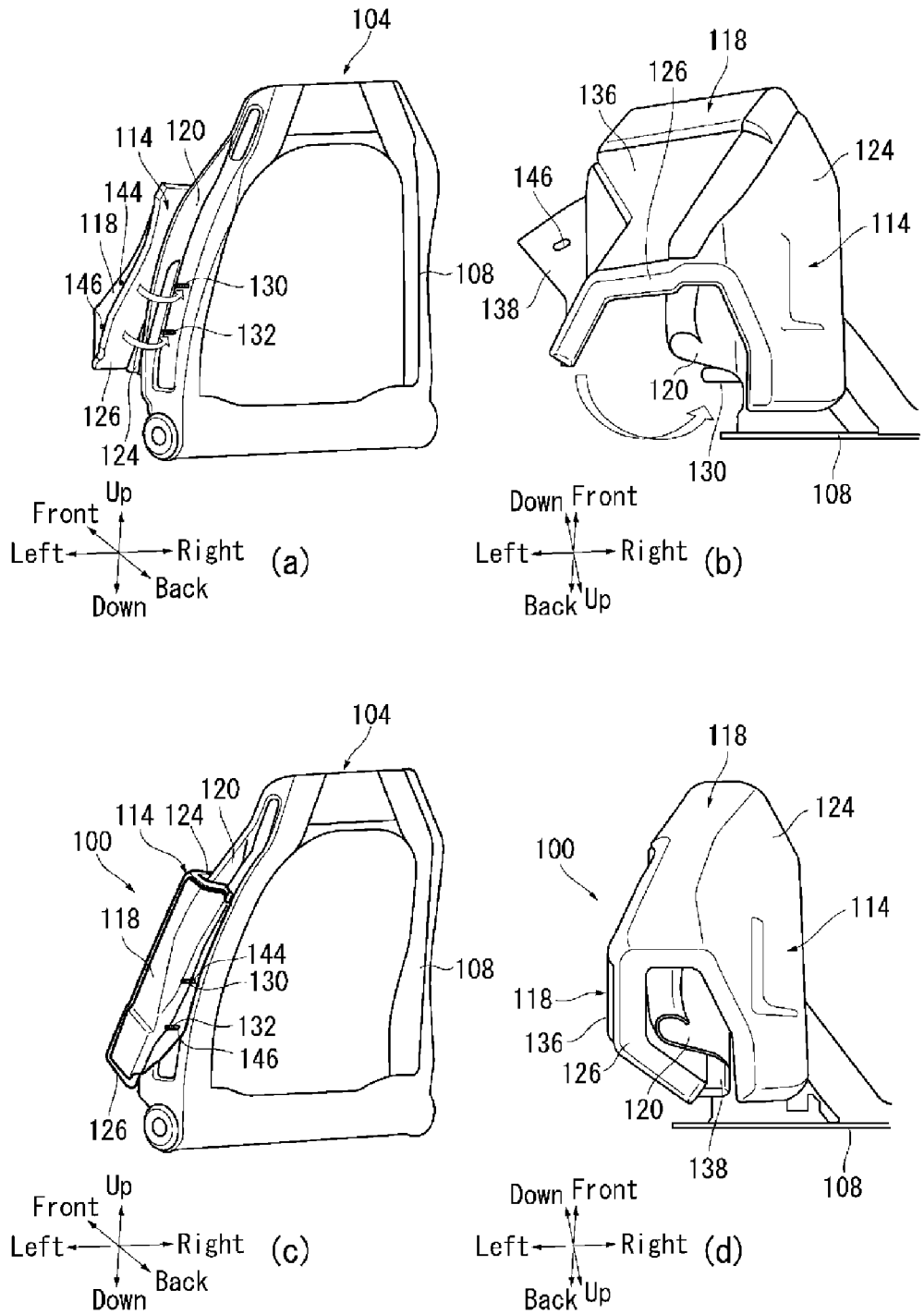
[FIG. 5]

[FIG. 6]

|  | Shoulder (ms) | Chest (ms) | Abdomen (ms) | Waist (ms) | Full deployment (ms) |
|---|---|---|---|---|---|
| Present Embodiment | 5.4 | 2.8 | 2.2 | 7.2 | 7.2 |
| Comparative Example | 5.2 | 3.0 | 2.4 | 8.0 | 8.0 |

[FIG. 7]
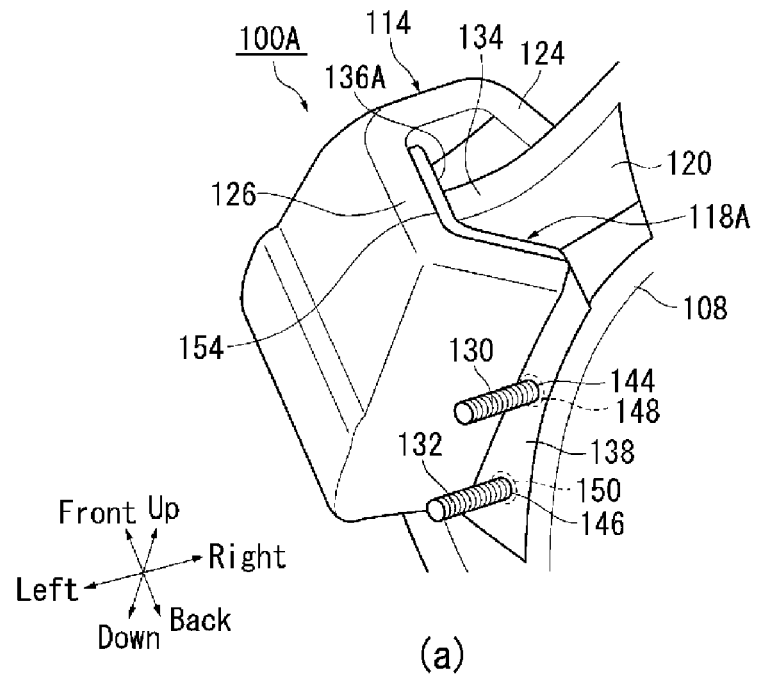
(a)
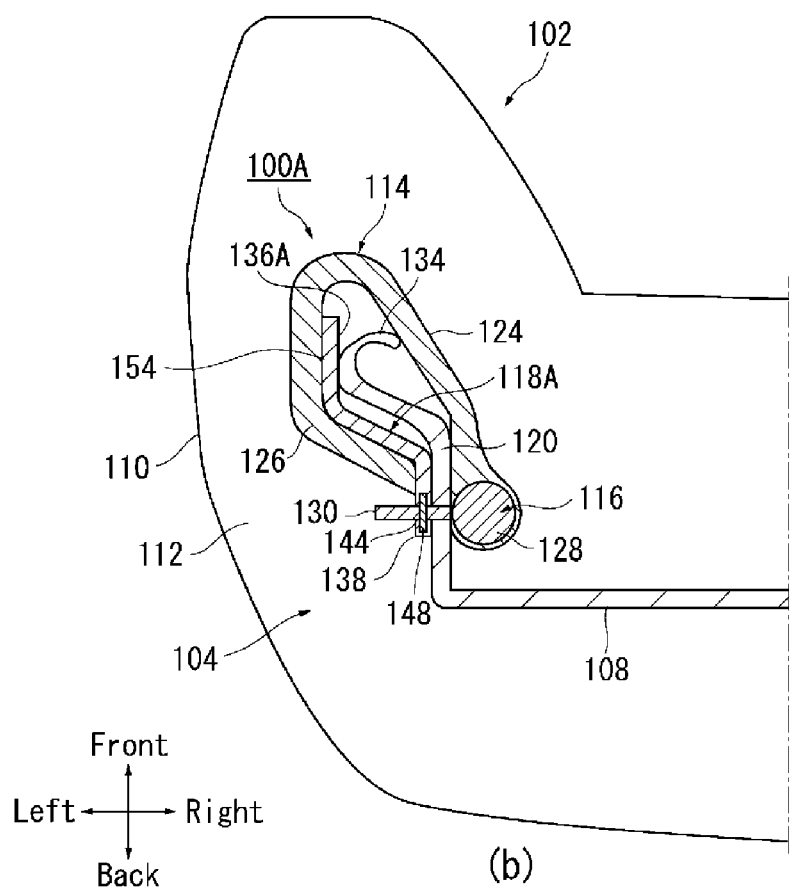
(b)

[FIG. 8]
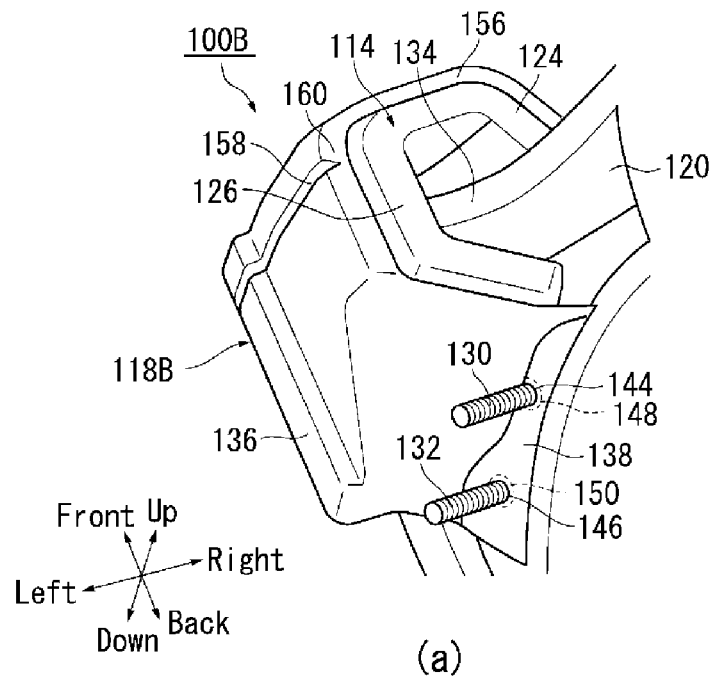
(a)
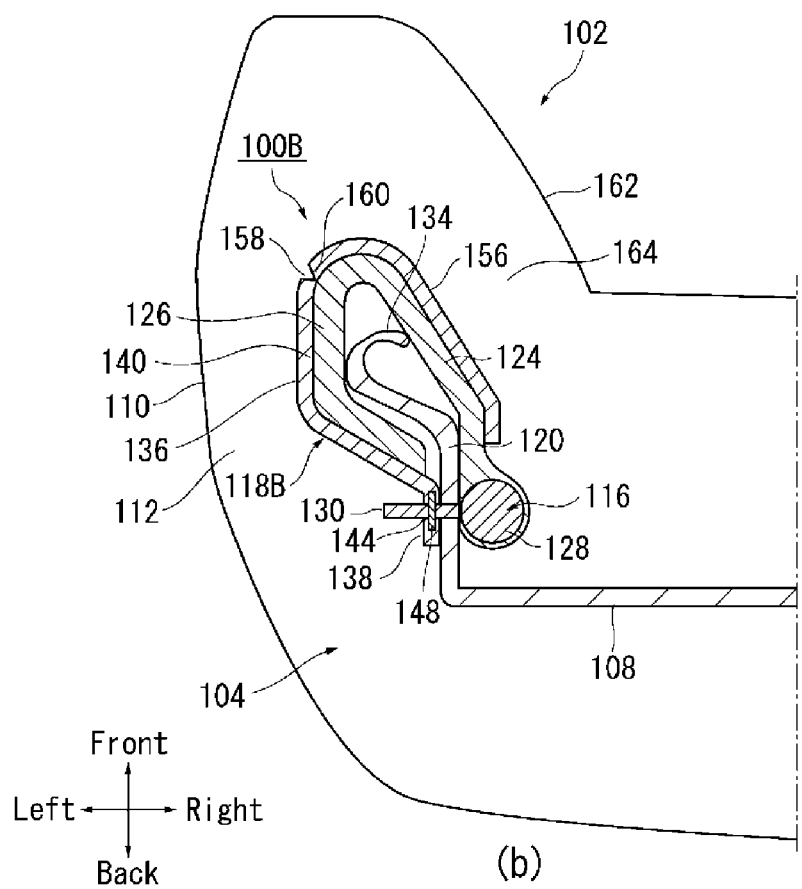
(b)

SIDE AIRBAG DEVICE

TECHNICAL FIELD

The present invention relates to a side airbag device provided with a bag-shaped cushion that expands and deploys to a side of an occupant of a vehicle seat in the event of a vehicle side impact or the like.

BACKGROUND TECHNOLOGY

Airbag devices have generally become standard equipment in vehicles in recent years. An airbag device is a safety device that is operated in the event of an emergency such as a vehicle collision or the like to receive and protect an occupant by expanding and deploying a cushion based on gas pressure. As an example, a side airbag device is provided with a bag-shaped cushion that expands and deploys to a side of an occupant of a vehicle seat in the event of a vehicle side impact or the like.

The cushion is stowed in the seat back of the vehicle seat in a folded state. The seatback includes a seat frame, a surface skin, and a seat pad. The seat frame is a member that forms the skeleton of the seatback, and is built into the seatback along the side surfaces and upper edge of the seatback.

The airbag unit of Patent Document 1 is attached to the side frame of the back frame (seat frame) of the seatback on the side opposite to the occupant side, and is stowed inside the seatback of the vehicle seat in a state where the airbag (cushion) is folded.

This vehicle seat has through-holes and a seam. The through-holes are formed in the cushion pad and serve as a deployment path for the airbag. The seam is formed in the surface skin cover of the cushion pad and is broken by being pressed by the deployment pressure of the airbag. The sewing line of this seam is located in the open area of the through-hole. A front end part of webbing having a low elongation rate is sewn to the end of the seam sewn by the sewing line.

The webbing is passed through the through-hole of the cushion pad and engaged with the side frame to which the airbag unit is secured, and is provided in a loose state so as not to pull the skin cover into the through-hole of the cushion pad. Therefore, according to Patent Document 1, it is possible to prevent or suppress the surface skin cover from being pulled into the holes of the cushion pad by the tension of the webbing, so that the appearance of the seat back is not spoiled.

PRIOR ART DOCUMENTS

Patent Documents

[Patent Document 1] Japanese Unexamined Patent Application 2010-95020

SUMMARY OF THE INVENTION

Problem to be Solved by the Invention

However, the airbag unit of Patent Document 1 merely prevents the appearance (outer appearance) of the seatback from being spoiled. After the cushion is folded and attached to the seat frame inside the seat back, even if the cushion collapses (loss of shape), the cushion cannot be seen from outside of the seat back, which does not necessarily mean that measures are taken to reduce collapse. Therefore, the unfolded cushion may not be stable in the deployment direction when expanded and deployed, impairing the deployment performance.

In light of these problems, an object of the present invention is to provide a side airbag device that can prevent the cushion attached to the side of the seat frame from losing shape and stabilize the deployment performance of the cushion.

Means for Solving the Problem

In order to solve the problems described above, a typical configuration of a side airbag device according to the present invention is a side airbag device provided with a bag-like cushion that expands and deploys to the side of an occupant of a vehicle seat, including:
- a seat frame arranged within the seatback of the vehicle seat; and
- an inflator arranged on the occupant side of the seat frame and inserted into the cushion to supply gas to the cushion, wherein
- the cushion is stowed in the seatback in a folded state, the folded cushion containing a first portion positioned on the occupant side of the seat frame side part, and a second portion that is continuous with the first portion and positioned on the side opposite the occupant side of the seat frame side part, and wraps from the first portion toward the vehicle front side of the seat frame to sandwich the seat frame side part together with the first portion; and
- the side airbag device further includes a support plate that supports the second portion, the support plate including a main body part that overlaps the second portion and supports the second portion, and a rearward extending part extending from the main body part toward the rear of the vehicle relative to the second portion and having a through-hole formed therein through which a stud bolt of the inflator can pass through.

In the configuration described above, when the cushion is stowed in the seatback in a folded state, the first portion that is positioned on the seat frame side part on the occupant side and the second portion positioned on the side opposite the occupant of the seat frame side part sandwich the seat frame side part. The main body part of the support plate also supports the second portion of the folded cushion. Therefore, collapse of the cushion (losing its shape) can be prevented, stabilizing the unfolding performance of the cushion.

In addition, the support plate supports the second portion of the cushion by allowing the stud bolt of the inflator to pass through the through-hole of the rearward extending part that extends from the main body part, thereby also functioning as a guide when the cushion is deployed, allowing the deployment direction to be stabilized. In the above configuration, since the support plate supports only the second portion of the cushion, there is no need to break the support plate when the cushion is expanded and deployed, and there is no need to form a slit or the like for breaking the support plate.

The main body part of the support plate is preferably provided on the side surface of the second portion of the cushion opposite to the occupant side.

Thereby, the main body part of the support plate is located on the side opposite the occupant side of the second portion of the cushion. Therefore, the main body part of the support plate is pushed by the second portion to the side opposite to the occupant side when the cushion is expanded and deployed, so that the surface skin of the seat back and the seat pad can be pushed and split rapidly. Therefore, the expansion and deployment speed of the cushion can be improved.

It is preferable that the main body part of the support plate is provided on the side surface of the second portion of the cushion that faces the occupant.

As a result, the main body part of the support plate is positioned between the second portion of the cushion and the seat frame side part on the occupant side of the second portion, and therefore acts as a reaction force surface against the second portion when the cushion is expanded and deployed. Therefore, the deployment performance of the cushion can be stabilized.

It is preferable that the main body part of the support plate described above overlaps a portion of the second portion of the cushion excluding upper, lower, and front edges of the second portion when viewed from the side of the vehicle.

According to such a configuration, the second portion of the cushion does not get caught on the main body part of the support plate when expanded and deployed. Therefore, in the above configuration, the expansion performance of the cushion can be stabilized while the second portion is supported by the support plate.

The support plate may further include a forward extending part that extends from the main body part toward the front of the vehicle beyond the second portion of the cushion and wraps around to overlap the first portion.

Thereby, the support plate can support the second portion via the main body part, support the first portion via the forward extending part, and cover the first portion and the second portion. Therefore, in the configuration described above, it is possible to maintain the shape of the cushion, and to reliably prevent the cushion attached to the side part of the seat frame from losing its shape.

The support plate may further include a breakable part formed at the boundary between the main body part and the forward extending part and capable of being broken when the cushion is expanded and deployed.

As a result, the support plate is broken via the breakable part when the cushion is expanded and deployed, and is separated into the main body part and the forward extending part. For this reason, the support plate has the main body part pushed to the side opposite to the seat frame by the second portion of the cushion, and the forward extending part pushed to the occupant side of the seat frame by the first portion of the cushion. With the support plate, the separated main body part and forward extending part push the surface skin of the seat back and the seat pad, respectively, to quickly cleave them apart. Therefore, the expansion and deployment speed of the cushion can be reliably improved. As an example, the breakable part may be a slit extending in the up-and-down direction or vertical direction or the longitudinal direction of the support plate. Further, the breakable part is not limited to a slit, and may be perforation extending in the up-and-down direction, a thin part, a groove, or the like. The groove may be provided on the outside or inside of the support plate as appropriate depending on the folded state and deployment behavior of the cushion.

The support plate described above may be formed by hot pressing a ductile fabric material comprising a plurality of polymeric fibers.

Thereby, the support plate can be folded together with the folded cushion by forming the support plate, for example, by heat-compressing a ductile fabric material (felt material). Therefore, the shape of the cushion can be maintained by the support plate.

The main body part of the support plate is preferably sewn to the second portion of the cushion.

In this manner, the support plate has the main body part sewn to the second portion of the cushion, and the stud bolt of the inflator is passed through the through-hole of the rearward extending part, thereby reliably supporting the second portion of the cushion.

The support plate described above may further include a metal part positioned within the rearward extending part and around the through-hole.

This means that when the support plate is formed by heating and compressing, for example, a ductile fabric material (felt material), the support plate is pressed between thin metal parts such as washers, and the support plate contains a felt material and a metal part located inside the felt material. Here, in the mounting work for mounting the cushion to the side part of the seat frame, the stud bolt of the inflator is passed through the through-hole of the rearward extending part of the support plate, and a nut is further tightened to the stud bolt. In this mounting operation, the stud bolt also passes through the metal part arranged around the through-hole of the rearward extending part, so that an appropriate tightening torque can be obtained when fastening the nut to the stud bolt. In addition, since metal parts such as washers are pre-arranged inside the rearward extending part of the support plate, there is no need for a worker to prepare washers and the like during the mounting work, and work efficiency is improved.

Effect of the Invention

According to the present invention, a side airbag device can be provided capable of stabilizing the deployment performance of the cushion by preventing loss of shape of the cushion attached to the side part of the seat frame.

BRIEF DESCRIPTION OF THE DRAWINGS

FIG. 1 is a diagram depicting an outline of a side airbag device according to an embodiment of the present invention.

FIG. 2 is a diagram depicting a state of viewing the side airbag device of FIG. 1(*b*) from the other direction.

FIG. 3 is a cross section view of the side airbag device in FIG. 2(*b*) taken along C-C.

FIG. 4 is a diagram depicting the mounting operation of mounting the folded cushion to the side of the seat frame.

FIG. 5 is a diagram depicting the mounting work subsequent to FIG. 4.

FIG. 6 is a diagram depicting the results of comparing the embodiment and comparative example of the present invention.

FIG. 7 is a diagram depicting the side airbag device according to another embodiment of the present invention.

FIG. 8 is a diagram depicting a side airbag device according to a further embodiment of the present invention.

EMBODIMENTS OF THE INVENTION

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram depicting an outline of a side airbag device 100 according to an embodiment of the present invention. FIG. 1(a) is a perspective view depicting a part of the inside of the vehicle. FIG. 1(b) is a diagram depicting a state in which the side airbag device 100 of FIG. 1(a) is viewed obliquely from behind along with the vehicle seat 102.

Regarding the present Embodiment, when an occupant is seated in a seat in a regular posture, the direction the occupant faces is referred to as front, and the opposite direction is referred to as rear. Furthermore, when the occupant is seated in the seat in a regular posture, the right of the occupant is referred to as the right direction, and the left of the passenger is referred to as the left direction. Furthermore, when the occupant is seated in a regular posture, the direction towards the head of the occupant is referred to as up, and the direction towards the legs of the occupant is referred to as down. Furthermore, as needed, any diagrams used in descriptions below will indicate the front, rear, left, right, up, and down directions based on the occupant as described above as Front, Rear, Left, Right, Up, and Down.

As depicted in FIG. 1(a), the side airbag device 100 is installed in the seat back 104 of the vehicle seat 102 on the left side of the vehicle, which serves as, for example, a passenger seat in the vehicle. The vehicle seat 102 has a seat back 104 and a seat cushion 106 on which an occupant sits.

The seat back 104 of the vehicle seat 102 has a seat frame 108 as depicted in FIG. 1(b). The seat frame 108 is a skeleton member of the seat back 104 and is built into the seat back 104 along the side surfaces and upper edge of the seat back 104. FIG. 1(b) depicts only the seat frame 108 of the seatback 104, omitting the surface skin 110 depicted in FIG. 1(a) and the seat pad 112 made of, for example, urethane material.

The side airbag device 100 includes the seat frame 108 described above, a bag-like cushion 114 depicted in FIG. 1(b), an inflator 116 (see FIG. 3), and a support plate 118. The cushion 114 is formed into a bag-like shape by weaving using the OPW (One-Piece Woven) method, for example, and is folded and attached to the side part 120 of the seat frame 108 as depicted in FIG. 1(b).

The cushion 114 is erected between the vehicle seat 102 and the side door 122 and expands and deploys to the side of the occupant using gas supplied from the inflator 116 in an emergency such as when the vehicle is impacted. The support plate 118 is formed by heat-compressing a ductile fabric material (felt material) containing a plurality of polymeric fibers and supports the folded cushion 114.

FIG. 2 is a diagram depicting a state in which the side airbag device 100 of FIG. 1(b) is viewed from another direction. FIGS. 2(a) and 2(b) depict arrows A and B in FIG. 1(b), respectively. FIG. 3 is a cross section view of the side airbag device of FIG. 2(b) taken along the line C-C.

The folded cushion 114 has a first portion 124 and a second portion 126 as depicted in FIG. 2(a) and FIG. 3. The first portion 124 is positioned on the occupant side of the side part 120 of the seat frame 108 as depicted in FIG. 3. Further, an inflator 116 arranged on the occupant side of the side part 120 of the seat frame 108 is inserted inside the first portion 124. The inflator 116 is cylindrical and secured to the side part 120 of the seat frame 108 by stud bolts 130 and 132 projecting from a main body 128 and depicted in FIG. 2(a).

The second portion 126 is continuous with the first portion 124 and is positioned on the opposite side of the side part 120 of the seat frame 108 from the occupant side. The second portion 126 extends from the first portion 124 to a front end part 134 of the seat frame 108 on the front side of the vehicle, and sandwiches the side part 120 of the seat frame 108 together with the first portion 124.

The support plate 118 has a main body part 136 and a rearward extending part 138. The main body part 136 overlaps the second portion 126 to support the second portion 126. The second portion 126 is arranged between the main body part 136 and the side part 120 of the seat frame 108 as depicted in FIG. 3. Also, the main body part 136 is provided on the side surface 140 of the second portion 126 as depicted in FIG. 3. The side surface 140 is a side surface of the second portion 126 positioned on the side opposite to the occupant side. Furthermore, the main body part 136 is joined by sewing to the second portion 126 of the cushion 114 near the vehicle front end part 142 thereof.

The rearward extending part 138 of the support plate 118 is a portion that extends from the main body part 136 further to the rear of the vehicle than the second portion 126. In addition, through-holes 144 and 146 are formed in the rearward extending part 138 through which the stud bolts 130 and 132 of the inflator 116 pass, as depicted in FIG. 2(a). The stud bolts 130 and 132 pass through not only the through-holes 144 and 146, but also the side part 120 of the seat frame 108 as depicted in FIG. 3.

The support plate 118 is joined to the second portion 126 of the cushion 114 by sewing at the vicinity of the end part 142 of the main body part 136, and the stud bolts 130 and 132 of the inflator 116 are passed through the through-holes 144 and 146 of the rearward extending part 138, thus providing reliable support for the second portion 126 of the cushion 114.

In this manner, the support plate 118 supports the second portion 126 by allowing the stud bolts 130 and 132 of the inflator 116 to pass through the through-holes 144 and 146 of the rearward extending part 138 while mounting the cushion 114 in a folded state to the side part 120 of the seat frame 108.

Further, since the support plate 118 is formed by heating and compressing a ductile cloth material (felt material), it can be folded together with the cushion 114 in the folded state. Therefore, the support plate 118 can retain the shape of the cushion 114.

Additionally, the support plate 118 includes washers 148 and 150. The washers 148 and 150 are thin metal components arranged inside the rearward extending part 138 and around through-holes 144 and 146. FIG. 3 depicts the washer 148 arranged inside the rearward extending part 138.

When forming the support plate 118 by heating and compressing a felt material, the washers 148 and 150 as metal parts are sandwiched and pressed. Thereby, the support plate 118 includes the felt material and the metal parts arranged inside the felt material.

Here, in the mounting work for mounting the folded cushion 114 to the side part 120 of the seat frame 108, the stud bolts 130 and 132 of the inflator 116 are passed through the through-holes 144 and 146 of the rearward extending part 138 of the support plate 118, and further, nuts (not depicted) are fastened to the bolts 130 and 132.

In this mounting operation, the stud bolts 130 and 132 also pass through the washers 148 and 150 arranged on the periphery of the through-holes 144 and 146 of the rearward extending part 138, so the correct tightening torque can be obtained when the nuts are fastened to the stud bolts 130 and 132. In addition, since the washers 148 and 150 are pre-arranged inside the rearward extending part 138 of the support plate 118, there is no need for the operator to prepare the washers 148 and 150 during the mounting work, which improves work efficiency.

In the side airbag device 100, the side part 120 of the seat frame 108 is sandwiched between the first portion 124 and the second portion 126 with the cushion 114 folded and attached to the side portion 120 of the seat frame 108, while the support plate 118 supports the second portion 126.

Therefore, according to the side airbag device 100, after the cushion 114 in the folded state is attached to the side part 120 of the seat frame 108, the cushion 114 can be prevented from collapsing (loss of shape), enabling stabilizing deployment performance of the cushion 114.

Furthermore, the support plate 118 supports the second portion 126 of the cushion 114 by allowing the stud bolts 130 and 132 of the inflator 116 to pass through the through-holes 144 and 146 of the rearward extending part 138 extending from the main body part 136. Therefore, in the side airbag device 100, the support plate 118 also functions as a guide when the cushion 114 is deployed, so that the deployment direction of the cushion 114 can also be stabilized.

Furthermore, since the support plate 118 supports only the second portion 126 of the cushion 114, there is no need to break the support plate 118 when the cushion 114 is expanded and deployed. Therefore, since it is not necessary to form a slit or the like for breaking the support plate 118, the configuration can be simplified.

Also, the second portion 126 of the cushion 114 is arranged between the main body part 136 of the support plate 118 and the side part 120 of the seat frame 108. Furthermore, the main body part 136 of the support plate 118 is provided on the side surface 140 (see FIG. 3) of the second portion 126 of the cushion 114 on the side opposite to the occupant side. Therefore, the main body part 136 of the support plate 118 is pushed to the side opposite to the occupant side by the second portion 126 when the cushion 114 is expanded and deployed. As a result, the main body part 136 of the support plate 118 can push the surface skin 110 of the seat back 104 and the seat pad 112 during expansion and deployment of the cushion 114 as depicted in FIG. 3. Therefore, the expansion and deployment speed of the cushion 114 can be improved.

Furthermore, as depicted in FIG. 2(b), the main body part 136 of the support plate 118 overlaps the second portion 126 excluding the upper, lower, and front end part 152 of the second portion 126 of the cushion 114 when viewed from the side of the vehicle. Therefore, the second portion 126 of the cushion 114 does not get caught on the main body part 136 of the support plate 118 during expansion and deployment. Therefore, in the side airbag device 100, the deployment performance of the cushion 114 can be stabilized while supporting the second portion 126 with the support plate 118.

FIG. 4 is a diagram depicting the mounting operation of mounting the folded cushion 114 to the side part 120 of the seat frame 108. FIG. 5 is a diagram depicting the mounting work subsequent to FIG. 4.

FIG. 4(a) depicts a state where the inflator 116 (see FIG. 3) is attached to the first portion 124 of the folded cushion 114, the support plate 118 is assembled to the second portion 126, and the stud bolts 130 and 132 penetrate through the through-holes 144 and 146 of the rearward extending part 138 of the support plate 118.

First, a worker attaches the inflator 116 to the first portion 124 of the cushion 114 and then assembles the support plate 118 to the second portion 126. Furthermore, as depicted by arrows in FIG. 4(b) and FIG. 4(c), the stud bolts 130 and 132 of the inflator 116 that penetrate the first portion 124 of the cushion 114 are brought near the side part 120 of the seat frame 108 of the seatback 104.

Next, the operator passes the stud bolts 130 and 132 of the inflator 116 through the side part 120 of the seat frame 108 as depicted in FIG. 5(a) and FIG. 5(b). In this manner, the inflator 116 and the first portion 124 of the cushion 114 are arranged on the occupant side of the side part 120 of the seat frame 108.

Furthermore, as depicted in FIG. 5(a) and FIG. 5(b), the second portion 126 of the cushion 114 to which the support plate 118 is assembled is wrapped around the seat frame 108 on the front side of the vehicle. Then, the second portion 126 of the cushion 114 is bent toward the side part 120 of the seat frame 108 as depicted by the arrow in the diagram, and the through-holes 144 and 148 of the rearward extending part 138 of the support plate 118 are brought near the stud bolts 130 and 132 of the inflator 116.

Next, the stud bolts 130 and 132 of the inflator 116 are caused to penetrate the through-holes 144 and 146 of the rearward extending part 138 of the support plate 118, as depicted in FIG. 5(c) and FIG. 5(d). In this manner, the cushion 114 is folded and attached to the side part 120 of the seat frame 108 and with the first portion 124 and the second portion 126 sandwiching the side part 120 of the seat frame 108 and further, the second portion 126 is supported by the support plate 118. This manner of mounting operation enables providing the side airbag device 100 in which the folded cushion 114 as depicted in FIG. 1(b) is attached to the side part 120 of the seat frame 108.

FIG. 6 is a diagram depicting the result of comparing the embodiment and comparative example of the present invention. In the side airbag device 100 of the present embodiment, as described above, when the cushion 114 is expanded and deployed, the main body part 136 of the support plate 118 is pushed by the second portion 126 of the cushion 114 to the side opposite to the occupant side, and thereby the surface skin 110 of the seatback 104 and the seat pad 112 are pushed to quickly cleave them apart.

On the other hand, a side airbag device as a comparative example has a configuration in which the cushion 114 is covered with an existing soft cover in place of the support plate 118. This soft cover does not include the function of supporting the cushion 114 like a support plate.

In the diagram, the time (ms) required for the cushion 114 to cover the shoulders, chest, abdomen, and waist of the occupant when the cushion 114 is expanded and deployed, and the time (ms) required for complete deployment are shown for the present embodiment and for the comparative example.

According to the comparison results, the time (ms) required to cover the chest, abdomen, and waist, and the time (ms) required for complete deployment were shortened compared to the comparative example, particularly shortening the time to cover the abdomen and the time for full deployment.

For this reason, it has been clarified that a configuration like that of the side airbag device 100 of the present embodiment, where a support plate 120 supports the second portion 126 of the cushion 114 and the main body part 136 of the support plate 118 is pushed to the side opposite the occupant side by the second portion 126 during expansion and deployment of the cushion 114, improves the expansion and deployment speed of the cushion 114.

FIG. 7 is a diagram depicting a side airbag device 100A according to another embodiment of the present invention. FIG. 7(a) and FIG. 7(b) correspond to FIG. 2(a) and FIG. 3, respectively. The side airbag device 100A differs from the side airbag device 100 in that a support plate 118A is provided instead of the support plate 118 described above.

A main body part 136A of the support plate 118A is arranged between the second portion 126 of the cushion 114 and the side part 120 of the seat frame 108 and provided on the side surface 154 of the second portion 126 of the cushion 114 as depicted in FIG. 7(b). A side surface 154 is a side surface of the second portion 126 positioned on the occupant side. That is, the main body part 136A of the support plate 118A is positioned on the occupant side of the second portion 126 between the second portion 126 of the cushion 114 and the side part 120 of the seat frame 108.

Therefore, in the side airbag device 100, the main body part 136A of the support plate 118A forms a reaction force surface against the second portion 126 when the cushion 114 is expanded and deployed, thereby enabling stabilizing the deployment performance of the cushion 114.

FIG. 8 is a diagram depicting a side airbag device 100B according to still another embodiment of the present invention. FIG. 8(a) and FIG. 8(b) correspond to FIG. 2(a) and FIG. 3, respectively. The side airbag device 100B differs from the side airbag device 100 in that it includes a support plate 118B instead of the support plate 118 described above.

The support plate 118B has a forward extending part 156 in addition to the main body part 136 and the rearward extending part 138. The forward extending part 156 extends to the front of the vehicle from the main body part 136 beyond the second portion 126 of the cushion 114 and wraps around to overlap the first portion 124. The forward extending part 156 is formed integrally with the main body part 136 and the rearward extending part 138, and is formed, for example, by heating and compressing a felt material.

Therefore, the support plate 118B can support the second portion 126 with the main body part 136, support the first portion 124 with the forward extending part 156, and cover the first portion 124 and second portion 126 of the cushion 114.

Therefore, in the side airbag device 100B, the shape of the cushion 114 can be maintained; furthermore, loss of shape of the cushion 114 attached to the side part 120 of the seat frame 108 can reliably be prevented.

The support plate 118B further has a slit 158. The slit 158 is formed at a boundary 160 between the main body part 136 and the forward extending part 156, and is a breakable part that can be broken when the cushion 114 is expanded and deployed. The slit 158 may extend in the up-and-down direction or vertically as depicted in FIG. 8(a), or may extend in the longitudinal direction of the support plate 118B. Although the slit 158 is formed at the boundary 160 between the main body part 136 and the forward extending part 156, this is not a limitation, and the slit may be formed at a portion where the support plate 118B is bent to enable the support plate 118B to be easily broken. Further, the breakable part is not limited to the slit 158, and may be a perforation extending in the vertical direction, a thin part, a groove, or the like. A groove may be provided on the outside or inside of the support plate 118B as appropriate depending on the folded state and deployment behavior of the cushion 114.

Therefore, the support plate 118B is broken by the slit 158 when the cushion 114 is expanded and deployed, and is separated into the main body part 136 and the forward extending part 156. As a result, the main body part 136 of the support plate 118B is pushed to the occupant side and opposite side by the second portion 126 of the cushion 114, and the forward extending part 156 is pushed to the occupant side of the seat frame side part 120 by the first portion 124.

Therefore, in the side airbag device 100B, the separated main body part 136 and the forward extending part 156 of the support plate 118B push the surface skins 110 and 162 of the seat back 104 and the seat pads 112 and 164, respectively, to rapidly cleave them apart. Therefore, the expansion and deployment speed of the cushion 114 can be reliably improved.

In addition, in the side airbag device 100B, the first portion 124 and the second portion 126 of the cushion 114 can be covered by the main body part 136 and the forward extending part 156 of the support plate 118B. Therefore, the support plate 118B can be folded together with the cushion 114 after the support plate 118B is attached to the cushion 114. Accordingly, in the side airbag device 100B, the shape of the cushion 114 can be maintained, and furthermore, the cushion 114 attached to the side part 120 of the seat frame 108 can be prevented from losing its shape.

In the mounting work of attaching the cushion 114 to the side part 120 of the seat frame 108, the stud bolts 130 and 132 of the inflator 116 are passed through the side part 120 of the seat frame 108, and then the support plate 118B is folded together with the cushion 114, allowing for easy attachment of the cushion 114 to the side part 120 of the seat frame 108.

Preferred Embodiments of the present invention were described with reference to the appended drawings, but it goes without saying that the present invention is not limited to such examples. It is clear that a person of ordinary skill in the art could conceive various modifications or revisions within the scope set forth by the claims, and it would be understood that these modifications or revisions would belong to the technical scope of the present invention.

Moreover, the example in which the side airbag device 100 according to the present invention is applied to automobiles has been described in the abovementioned embodiments. However, in addition to automobiles, the present invention can be applied to aircrafts, ships, and the like, with the same operations and effects capable of being exerted.

INDUSTRIAL APPLICABILITY

The present invention can be applied to a side airbag device provided with a bag-shaped cushion that expands and deploys to a side of an occupant in a vehicle seat in the event of a vehicle side impact or the like.

EXPLANATION OF CODES 100, 100A, 100B. Side airbag device; 102. Vehicle seat; 104. Seatback; 106. Seat cushion; 108. Seat frame; 110, 162. Surface skin; 112, 164. Seat pad; 114. Cushion; 116. Inflator; 118, 118A, 118B. Support plates; 120. Seat frame side part; 122. Side door; 124. First portion; 126. Second portion; 128. Inflator main body; 130, 132. Stud bolts; 134. Seat frame front end part; 136, 136A. Support plate main body part; 138. Rearward extending part; 140, 154. Second portion side surface; 142. Main body part end part; 144, 146. Through-hole; 148, 150. Washer; 152. Second portion edge part; 156. Forward extending part; 158. Slit; 160. Boundary.

The invention claimed is:

1. A side airbag device provided with a bag-like cushion that expands and deploys to the side of an occupant of a vehicle seat, comprising:
   a seat frame arranged within the seatback of the vehicle seat; and
   an inflator arranged on the occupant side of the seat frame and inserted into the cushion to supply gas to the cushion,
   wherein the cushion is stowed in the seatback in a folded state, the folded cushion containing a first portion positioned on the occupant side of a seat frame side part, and a second portion that is continuous with the first portion and positioned on the side opposite the occupant side of the seat frame side part, and wraps from the first portion toward the vehicle front side of the seat frame to sandwich the seat frame side part together with the first portion,
   wherein the side airbag device further includes a support plate that supports the second portion, the support plate including a main body part that overlaps the second portion and supports the second portion, and a rearward extending part extending from the main body part toward the rear of the vehicle relative to the second portion and having a through-hole formed therein through which a stud bolt of the inflator can pass through, and
   wherein the main body part of the support plate is provided on a side surface of the second portion of the cushion on the occupant side.

2. The side airbag device according to claim 1, wherein:
   the main body part of the support plate is provided on a side surface of the second portion of the cushion that is opposite to the occupant side.

3. The side airbag device according to claim 2, wherein:
   the main body part of the support plate overlaps a portion of the second portion of the cushion excluding the upper, lower, and front edge of the second portion as viewed from the vehicle side.

4. The side airbag device according to claim 1, wherein:
   the main body part of the support plate overlaps a portion of the second portion of the cushion excluding the upper, lower, and front edge of the second portion as viewed from the vehicle side.

5. The side airbag device according to claim 1, wherein:
   the support plate further comprises:
   a forward extending part that extends from the main body part toward the front of the vehicle beyond the second portion of the cushion and wraps around, and overlaps with the first portion.

6. The side airbag device according to claim 2, wherein:
   the support plate further comprises:
   a forward extending part that extends from the main body part toward the front of the vehicle beyond the second portion of the cushion and wraps around, and overlaps with the first portion.

7. The side airbag device according to claim 5, wherein:
   the support plate further comprises:
   a breakable part formed at a boundary between the main body part and the forward extending part that is breakable when the cushion is expanded and deployed.

8. The side airbag device according to claim 1, wherein the support plate is formed by heat-compressing a ductile cloth material containing a plurality of polymer fibers.

9. A side airbag device provided with a bag-like cushion that expands and deploys to the side of an occupant of a vehicle seat, comprising:
   a seat frame arranged within the seatback of the vehicle seat; and
   an inflator arranged on the occupant side of the seat frame and inserted into the cushion to supply gas to the cushion,
   wherein the cushion is stowed in the seatback in a folded state, the folded cushion containing a first portion positioned on the occupant side of a seat frame side part, and a second portion that is continuous with the first portion and positioned on the side opposite the occupant side of the seat frame side part, and wraps from the first portion toward the vehicle front side of the seat frame to sandwich the seat frame side part together with the first portion,
   wherein the side airbag device further includes a support plate that supports the second portion, the support plate including a main body part that overlaps the second portion and supports the second portion, and a rearward extending part extending from the main body part toward the rear of the vehicle relative to the second portion and having a through-hole formed therein through which a stud bolt of the inflator can pass through, and
   wherein
   the main body part of the support plate overlaps a portion of the second portion of the cushion excluding the upper, lower, and front edge of the second portion as viewed from the vehicle side.

10. A side airbag device provided with a bag-like cushion that expands and deploys to the side of an occupant of a vehicle seat, comprising:
    a seat frame arranged within the seatback of the vehicle seat; and
    an inflator arranged on the occupant side of the seat frame and inserted into the cushion to supply gas to the cushion,
    wherein the cushion is stowed in the seatback in a folded state, the folded cushion containing a first portion positioned on the occupant side of a seat frame side part, and a second portion that is continuous with the first portion and positioned on the side opposite the occupant side of the seat frame side part, and wraps from the first portion toward the vehicle front side of the seat frame to sandwich the seat frame side part together with the first portion,
    wherein the side airbag device further includes a support plate that supports the second portion, the support plate including a main body part that overlaps the second portion and supports the second portion, and a rearward extending part extending from the main body part toward the rear of the vehicle relative to the second portion and having a through-hole formed therein through which a stud bolt of the inflator can pass through, and
    wherein
    the main body part of the support plate is connected to the second portion of the cushion by sewing.

11. The side airbag device according to claim 10, wherein:
    the support plate further has a metal part arranged inside the rearward extending part and around the through-hole.

12. A side airbag device provided with a bag-like cushion that expands and deploys to the side of an occupant of a vehicle seat, comprising:
    a seat frame arranged within the seatback of the vehicle seat; and an inflator arranged on the occupant side of the seat frame and inserted into the cushion to supply gas to the cushion, wherein the cushion is stowed in the seatback in a folded state, the folded cushion containing a first portion positioned on the occupant side of a seat frame side part, and a second portion that is continuous with the first portion and positioned on the side opposite the occupant side of the seat frame side part, and wraps from the first portion toward the vehicle front side of the seat frame to sandwich the seat frame side part together with the first portion, wherein the side airbag device further includes a support plate that supports the second portion, the support plate including a main body part that overlaps the second portion and supports the second portion, and a rearward extending part extending from the main body part toward the rear of the vehicle relative to the second portion and having a through-hole formed therein through which a stud bolt of the inflator can pass through, wherein the support plate is formed by heat-compressing a ductile cloth material containing a plurality of polymer fibers, and wherein
the support plate further has a metal part arranged inside the rearward extending part and around the through-hole.

\* \* \* \* \*